(12) United States Patent
Falke et al.

(10) Patent No.: US 8,234,875 B2
(45) Date of Patent: Aug. 7, 2012

(54) GAS TURBINE FUEL METERING UNIT

(75) Inventors: Charles H. Falke, Union, CT (US); Leo J. Veilleux, Wethersfield, CT (US); Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/204,117

(22) Filed: Aug. 5, 2011

(65) Prior Publication Data
US 2011/0289931 A1 Dec. 1, 2011

Related U.S. Application Data

(62) Division of application No. 11/621,685, filed on Jan. 10, 2007, now Pat. No. 8,127,524.

(51) Int. Cl.
*F02C 7/22* (2006.01)
*F02C 7/26* (2006.01)

(52) U.S. Cl. ...... 60/776; 60/734; 60/39.091; 60/39.094; 60/739; 417/213; 417/217; 417/278; 417/308; 417/326

(58) Field of Classification Search ............ 60/734, 60/39.091, 39.094, 739, 39.84, 776; 417/302, 417/326, 328, 213, 217, 278, 208
See application file for complete search history.

(56) References Cited

U.S. PATENT DOCUMENTS

| | | | |
|---|---|---|---|
| 3,478,580 A | 11/1969 | Siemietkowski et al. | |
| 4,208,871 A | 6/1980 | Riple, Jr. | |
| 4,565,170 A * | 1/1986 | Grieshaber et al. | 123/359 |
| 5,159,808 A * | 11/1992 | Kast | 60/39.091 |
| 5,534,161 A * | 7/1996 | Tarr et al. | 210/744 |
| 5,809,771 A | 9/1998 | Wernberg | |
| 6,536,217 B2 * | 3/2003 | Lipinski et al. | 60/772 |
| 6,751,939 B2 | 6/2004 | Futa, Jr. et al. | |
| 7,726,112 B2 * | 6/2010 | Dooley | 60/39.094 |
| 2001/0054290 A1 * | 12/2001 | Herbison et al. | 60/734 |
| 2002/0095936 A1 | 7/2002 | Futa, Jr. et al. | |
| 2005/0100447 A1 * | 5/2005 | Desai et al. | 417/220 |
| 2008/0028742 A1 | 2/2008 | Parsons | |

* cited by examiner

*Primary Examiner* — William H Rodriguez
*Assistant Examiner* — Craig Kim
(74) *Attorney, Agent, or Firm* — Carlson, Gaskey & Olds, P.C.

(57) ABSTRACT

A fuel system for a turbine engine is provided. The fuel system includes a positive displacement pump driven by an electric motor. The pump is rotated in a first direction to deliver fuel to the turbine engine, and a second direction for evacuating fuel from the turbine engine. A shut-off check valve is open in a first direction in response to a first differential pressure created by the pump in the first direction. The shut-off check valve is biased to a closed position when the pump is rotating in the second direction. An ecology check valve is biased to a closed position in the first direction and open in the second direction in response to a second differential pressure created by the pump. The check valves open and close automatically in response to the pressures generated by the positive displacement pump in each of the first and second rotational directions. In this manner, simple, reliable valves are utilized to regulate the flow of fuel in the fuel system.

4 Claims, 3 Drawing Sheets

GAS TURBINE FUEL METERING UNIT

CROSS-REFERENCE TO RELATED APPLICATIONS

This application is a divisional of U.S. patent application Ser. No. 11/621,685 filed Jan. 10, 2007 now U.S. Pat. No. 8,127,524.

BACKGROUND OF THE INVENTION

This invention relates to a fuel metering unit for a gas turbine engine that employs a shut-off valve and an ecology function.

Fuel metering units are used to provide a desired quantity of fuel to, for example, a gas turbine engine used in aircraft. Aircraft fuel systems must meet numerous requirements. For example, the flow of fuel must be precisely modulated to provide the turbine engine's fuel needs. The flow of fuel must be shut-off without any leakage when fuel is no longer needed at the turbine engine. Typically, a shut-off valve is provided that is open and closed using a solenoid. The solenoid is controlled by a controller that commands the shut-off valve based upon numerous sensors. Failure of any component used to control the shut-off valve can result in a malfunction and fuel leak.

It is also desirable to drain fuel during shut down from a manifold with nozzles that is used provide fuel to the turbine engine's combustor. The fuel is drained from the manifold and nozzles to avoid environmental impact, fire risk and coking of the nozzles. The fuel is returned to the tank, and combustion products from the nozzles cannot be introduced into the fuel, which could cause contamination and corrosion. To this end, an ecology valve is used to provide the flow of fuel back to the fuel tank. The ecology valve typically includes a valve actuated by a solenoid or other actuator. Sensors are monitored by the controller and are used to open and close the ecology valve.

The valves within the fuel metering unit must withstand the pressure from the aircraft fuel supply when turbine engine is shut down. Moreover, a failure of any of the fuel system components cannot lead to an incorrect fuel flow to the turbine engine. The solenoid operated shut-off and ecology valves and associated sensors in the prior art are complex, and designing a system to avoid an adverse impact from their failure typically leads to increased cost and complexity. What is needed is a simplified and reliable fuel system for providing fuel to a gas turbine engine and aircraft.

SUMMARY OF THE INVENTION

A fuel system for a turbine engine is provided. The fuel system includes a positive displacement pump driven by an electric motor. The pump is rotated in a first direction to deliver fuel to the turbine engine, and a second direction for evacuating fuel from the turbine engine. A shut-off check valve is open in a first direction in response to a first differential pressure created by the pump in the first direction. The shut-off check valve is biased to a closed position when the pump is stopped or rotating in the second direction. Fuel is shut off drop tight for the case of the pump not being powered. Rapid shutoff can be implemented with suitable reverse drive or braking current. An ecology check valve is biased to a closed position in the first direction and open in the second direction in response to a second differential pressure created by the pump. The check valves open and close automatically in response to the pressures generated by the positive displacement pump in each of the first and second rotational directions. In this manner, simple, reliable valves are utilized to regulate the flow of fuel in the fuel system.

These and other features of the present invention can be best understood from the following specification and drawings, the following of which is a brief description.

DETAILED DESCRIPTION OF THE PREFERRED EMBODIMENT

Figure 1:
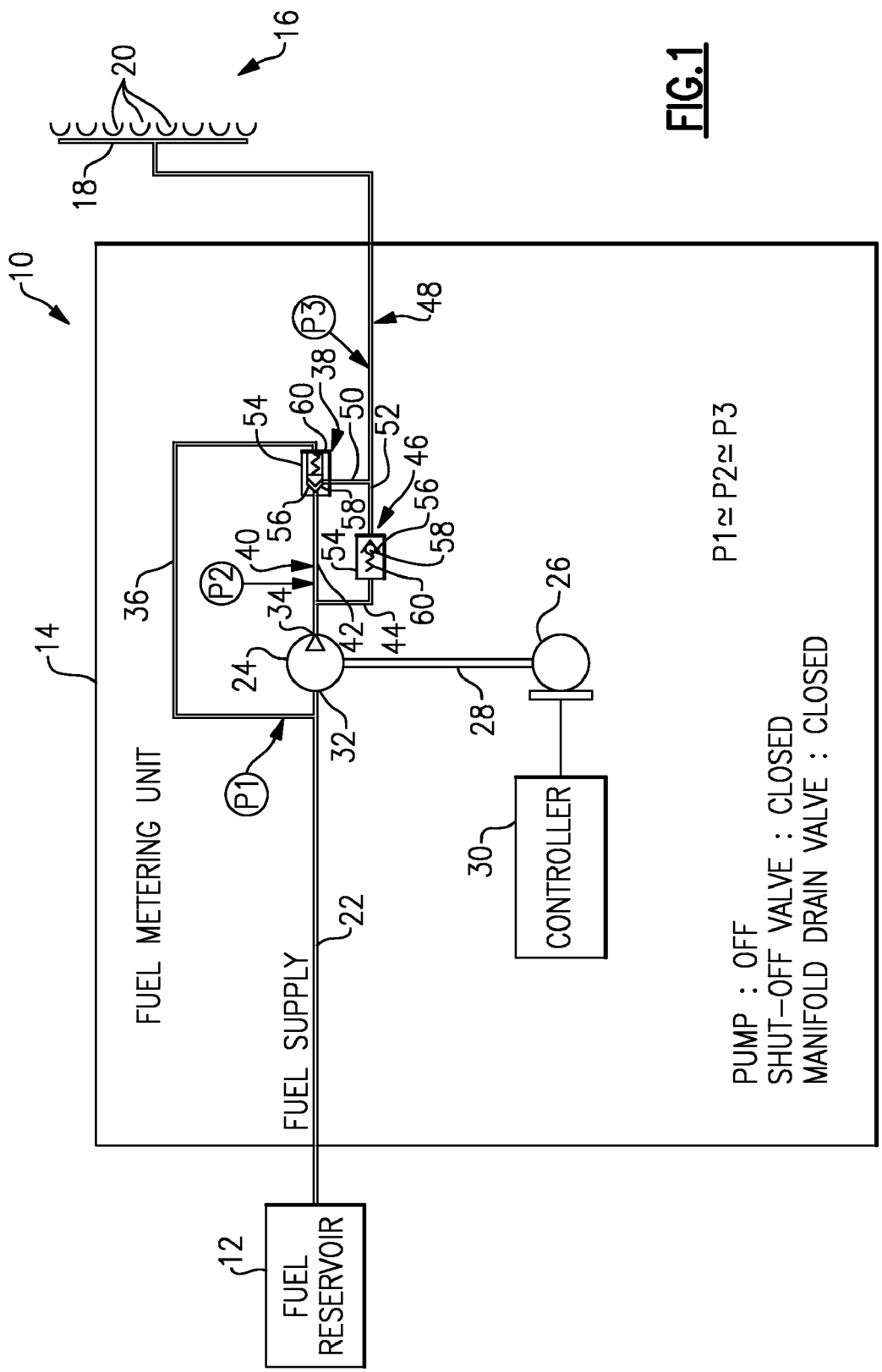
FIG. 1 is a schematic view of a fuel system with a pump off.

A fuel system 10 is schematically shown in FIG. 1. The fuel system 10 supplies fuel from a fuel source 12 to an engine 16. A fuel metering unit 14 regulates the flow of fuel between the fuel source 12 and engine 16.

The engine 16 in one example is a gas turbine engine for an aircraft. The engine 16 includes a manifold 18 supplying fuel to multiple nozzles 20. The nozzles 20 supply fuel to a combustor. It is desirable to evacuate the fuel in the manifold and nozzles 18, 20 during shut down of the engine 16.

A supply line 22 provides fuel from the fuel source 12 to a pump 24. In one example, the pump 24 is a positive displacement pump. A positive displacement pump delivers a predictable amount of fuel for each revolution of the pump. The speed of the pump is increased or decreased depending upon the desired amount of fuel required by the engine 16. An electric motor 26 rotationally drives the pump 24 in a desired direction through, for example, a shaft 28. A controller 30 commands the direction and speed of the pump 24.

The pump 24 includes first and second ports 32, 34. The first port 32 receives fuel from the supply line 22. A bypass line 36 fluidly connects the supply line 22 and a shut-off valve 38. The bypass line 36 is in fluid communication with the first port 32 and one side of the shut-off valve 38. A fuel circuit 40 is in fluid communication with another side of the shut-off valve 38 and the second port 34 through a first line 42. The fuel circuit 40 fluidly connects an ecology valve 46 to the second port 34 with a second line 44. A delivery line 48 fluidly connects the shut-off valve 38 and ecology valve 46 to the manifold 18 using third and fourth lines 50, 52, respectively.

FIG. 1 illustrates the pump 24 OFF. The supply line 22, bypass line 36 and first port 32 are at a first pressure P1. The fuel circuit 40 and second port 34 are at a second pressure P2. The delivery line 48 is at a third pressure P3. With the pump OFF, the first, second and third pressures P1, P2, P3 are approximately equal to one another. The shut-off valve 38 and ecology valve 46 are closed when the pump 24 is off to prevent fuel leaking to the engine 16.

The shut-off valve 38 and ecology valve 46 are check valves in the examples, which do not require any actuators to open and close the valve. The check valves simply open and close in response to differential pressures across the valves. Each check valve typically includes a housing 54 providing a seat 56. A spring 60 biases a ball 58 against the seat 56 to provide a closed position. The ball 58 becomes unsealed and moves to an open position compressing the spring 60 when the differential pressure across the check valve is such that the biasing force of the spring 60 can be overcome.

Figure 2:
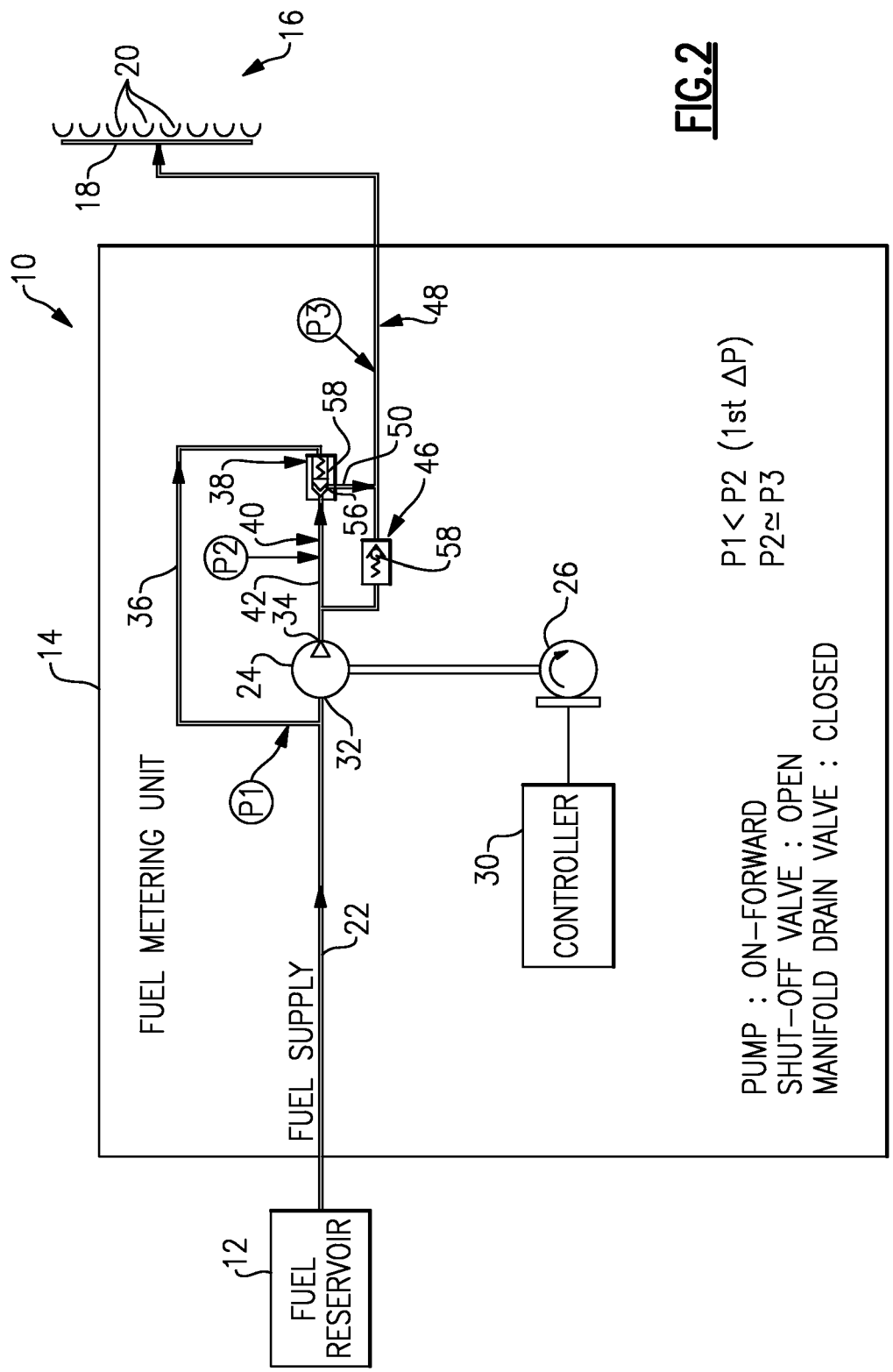
FIG. 2 is a schematic view of the fuel system shown in FIG. 1 with the pump rotating in a first direction.

FIG. 2 schematically illustrates the pump driven in a first or forward direction to deliver fuel to the engine 16. The outlet pressure at the second port 34 exceeds the inlet pressure at the first port 32 such that the second pressure P2 is greater than the first pressure P1, which results in a first differential pressure across the shut-off valve 38. More particularly, the second pressure P2 overcomes the biasing force on the ball 58 and the first pressure P1 so that the fuel circuit 40 is fluidly connected to the delivery line 48 through the open shut-off valve 38. The pressure drop across the shut-off valve 38 assists the spring to hold the ecology valve 46 closed.

Figure 3:
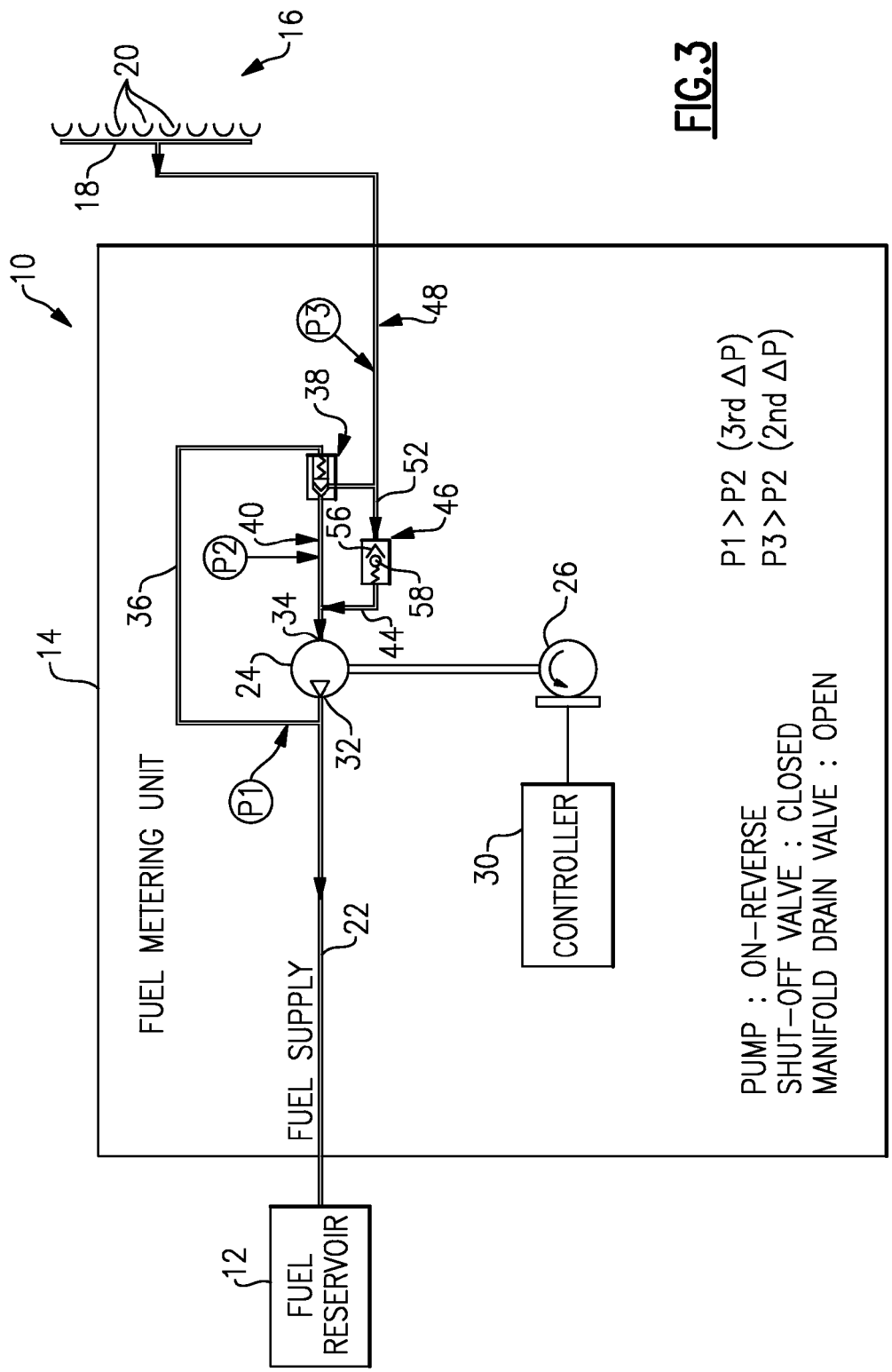
FIG. 3 is a schematic view of the fuel system shown in FIG. 1 with the pump rotating in a second direction that is the reverse of the first direction.

During shut-down, the controller commands the electric motor 26 to rotate in a reverse direction, which is schematically illustrated in FIG. 3. As a result of the reverse rotation of the pump 24, the second port 34 becomes the inlet port, and the first port 32 becomes the outlet port. Depending upon the moment during the engine shut down sequence, the third pressure P3 is decreasing towards atmospheric pressure. The reverse rotation of the pump 24 creates a vacuum in the fuel circuit 40 resulting in a second differential pressure across the ecology valve 46. The second differential pressure is provided by the second and third pressures P2, P3. The third pressure P3 is greater than the second pressure P2, which is efficient to overcome the biasing force providing by the spring in the ecology valve 46 and the second pressure P2 thereby opening the ecology valve.

One side of the shut-off valve 38 is exposed to the second pressure P2 in the fuel circuit 40, which corresponds to the inlet pressure of the pump 24. The bypass line 36 is at the outlet pressure of the pump 24 which corresponds to the first pressure P1, which acts on the other side of the shut-off valve 38. Since the outlet pressure (P1) at first port 32 is greater than the inlet pressure (P2) at second port 34 then the shut-of valve 38 is biased to the closed position. This also prevents any pressure from the fuel supply from opening the shut-off valve unless it is commanded by the pump. The reverse rotation of the pump 24 evacuates the fuel from the manifold 18 and nozzles 20 through the open ecology valve 46 back to the fuel source 12.

Although an example embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of managing fuel within a fuel system for a turbine engine comprising the steps of:
    a) rotating a pump in a first direction which creates a first differential pressure;
    b) automatically opening a shut-off valve with the first differential pressure for supplying fuel to a turbine engine;
    c) reversing rotation of the pump to a second direction which creates second and third differential pressures; and
    d) automatically opening an ecology valve with the second differential pressure for evacuating fuel from the turbine engine, and automatically closing the shut-off valve with the third differential pressure;
    wherein the pump includes first and second ports respectively providing first and second pressures, the first and second ports respectively providing an inlet and an outlet in the first direction, and the first and second ports respectively providing the outlet and the inlet in the second direction; and
    wherein the first differential pressure is provided by exposing the shut-off check valve to the first and second pressures, the second pressure greater than the first pressure in the first direction.

2. The method according to claim 1, wherein the shut-off and ecology valves are check valves.

3. The method according to claim 1, wherein the ecology valve is closed while performing step b).

4. The method according to claim 1, wherein steps c) and d) are performed during an engine shut down procedure.

\* \* \* \* \*